(12) United States Patent
Pringle

(10) Patent No.: US 7,154,035 B2
(45) Date of Patent: Dec. 26, 2006

(54) AVIAN GUARD APPARATUS FOR PROTECTION OF HIGH VOLTAGE TRANSMISSION EQUIPMENT

(76) Inventor: Robert Pringle, 668 Shamrock, Pismo Beach, CA (US) 93449

( * ) Notice: Subject to any disclaimer, the term of this patent is extended or adjusted under 35 U.S.C. 154(b) by 0 days.

(21) Appl. No.: 11/100,996

(22) Filed: Apr. 6, 2005

(65) Prior Publication Data

US 2006/0225907 A1    Oct. 12, 2006

(51) Int. Cl.
*H01B 17/00* (2006.01)
(52) U.S. Cl. .................. 174/5 R; 174/5 SB; 174/5 SG
(58) Field of Classification Search .............. 174/5 R, 174/5 SB, 5 SG, 41, 136; 51/101, 63; 135/913
See application file for complete search history.

(56) References Cited

U.S. PATENT DOCUMENTS

| 939,039 | A |   | 11/1909 | Field |   |
|---|---|---|---|---|---|
| 1,878,126 | A | * | 9/1932 | Gates | 52/101 |
| 3,042,736 | A |   | 7/1962 | Salisbury | 174/5 |
| 3,742,123 | A | * | 6/1973 | Haub, Jr. | 174/138 F |
| 3,824,676 | A |   | 7/1974 | Ebert | 29/450 |
| 4,359,844 | A |   | 11/1982 | Hoggard et al. | 52/101 |
| 5,299,528 | A |   | 4/1994 | Blankenship | 119/26 |
| 5,650,594 | A |   | 7/1997 | Urnovitz | 174/139 |
| 5,873,324 | A |   | 2/1999 | Kaddas et al. | 119/174 |
| 6,255,597 | B1 |   | 7/2001 | Bowling et al. | 174/138 |
| 6,257,537 | B1 |   | 7/2001 | Williams | 248/226.11 |
| 6,402,107 | B1 |   | 6/2002 | Chervick et al. | 248/226.11 |
| 6,640,506 | B1 |   | 11/2003 | Landers | 52/101 |
| 6,730,852 | B1 |   | 5/2004 | Puigcerver et al. | 174/138 |
| 2002/0117313 | A1 |   | 8/2002 | Spencer | 174/5 |
| 2003/0010528 | A1 |   | 1/2003 | Niles | 174/137 |

FOREIGN PATENT DOCUMENTS

JP            04357628         10/1992

* cited by examiner

*Primary Examiner*—Jinhee Lee
(74) *Attorney, Agent, or Firm*—Philip A. Steiner, Esq.

(57) ABSTRACT

An avian guard apparatus for protection of high voltage transmission equipment which comprises a generally rectangular frame of tubular construction dimensioned to longitudinally and laterally span a portion of a horizontally oriented cross bridge of a high voltage transmission tower superjacent to a high voltage insulator suspended from the cross bridge. The frame is generally rectangular frame in shape and includes a shade cloth mesh disposed over the generally rectangular frame. The mesh includes a pair of pockets longitudinally disposed at both ends of the mesh. Each of the pockets is dimensioned so as to laterally encompass each end of the generally rectangular frame. The avian guard may include a plurality of longitudinally interspersed flaps for attaching the avian guard to the cross bridge. Alternate mechanisms for attaching the avian guard to the cross bridge are also disclosed.

18 Claims, 3 Drawing Sheets

AVIAN GUARD APPARATUS FOR PROTECTION OF HIGH VOLTAGE TRANSMISSION EQUIPMENT

FIELD OF INVENTION

The present invention relates generally to an avian guard for protection of high voltage equipment and more specifically to a mesh and tubular frame assembly for placement on high voltage power distribution towers above suspended high voltage insulators.

BACKGROUND

High voltage insulators suspended from high voltage transmission towers are susceptible to dielectric breakdown due to the accumulation of excrements and debris from birds roosting and/or nesting above the insulators. Over time, the accumulated excrements and debris may cause arcing, resulting in damaged insulators and possible power outages. The susceptibility of dielectric breakdown of high voltage insulators is of particular significance in the western United States due to relatively long intervals between significant precipitations.

Arcing is more likely to occur during the summer dry seasons where electrical demands are generally at their greatest. In addition, hot cinders falling from arcing insulators increases the potential to spark large wildfires in the dry foliage, brush and grasses typically found below the high voltage transmissions towers.

To combat the accumulation of excrements and debris, electrical utility companies spend significant amounts of time, labor and money periodically cleaning and/or replacing the high voltage insulators affected by the birds.

In addition, many of the nesting species of birds which take advantage of the height of the high voltage transmission towers include protected species such as falcons, hawks, eagles, vultures and condors. As such, only non-harmful and environmentally friendly solutions to the deleterious effects caused by these nesting species are feasible.

Lastly, due to their remote nature, large numbers and the safety risks inherent in working in and around high voltage transmission towers, a simple, safe, inexpensive, and environmentally friendly solution to minimize the deleterious effects of roosting and/or nesting birds in high voltage transmission towers is highly desirable.

SUMMARY

The invention addresses the limitations described above and provides an inexpensive avian guard for protection of high voltage transmission insulators and equipment. In first embodiment of the invention, the avian guard apparatus comprises: a generally tubular frame dimensioned to at least longitudinally span a portion of a horizontally oriented bridge of a high voltage transmission tower superjacent to a high voltage insulator suspended from the bridge; a mesh disposed over a substantial portion of the generally tubular frame; means for attaching the mesh to the generally tubular frame; and means for attaching the avian guard to the bridge.

In a related embodiment of the invention, the means for attaching the mesh to the generally tubular frame comprises at least one pocket longitudinally disposed at an end of the mesh. In another related embodiment of the invention, the at least one pocket is dimensioned so as to laterally encompass an end of the generally tubular frame.

In another related embodiment of the invention, a first means for attaching the avian guard to the bridge comprises a plurality of flaps coupled to at least the mesh. In another related embodiment of the invention, each of the plurality of flaps further comprises an aperture dimensioned to receive a tie down means. In another related embodiment of the invention, the tie down means is at least one of tie wraps, twine, straps, clips and magnets. In another related embodiment of the invention, the plurality of flaps is interspaced longitudinally on at least a side of the generally tubular frame.

A second means for attaching the avian guard to the bridge comprises directly attaching the tie down means to the avian guard without the plurality of flaps. In a related embodiment of the invention, the generally tubular frame includes at least one indentation disposed along a longitudinal axis of the generally tubular frame which is dimensioned to peripherally surround a portion of a generally vertically oriented structural member of the high voltage transmission tower.

In another related embodiment of the invention, the at least one indentation is disposed generally less than paracentral from one end of the generally tubular frame. In another related embodiment of the invention, a second indentation is disposed contralateral to the at least one indentation.

In a related embodiment of the invention, the mesh includes an ultraviolet ray resistant polymer construction. In another related embodiment of the invention, the mesh is constructed from an exterior grade shade cloth. In another related embodiment of the invention, the tie down means is at least one of tie wraps, twine, straps, clips and magnets.

In a second embodiment of the invention, the avian guard apparatus comprises: a generally tubular frame dimensioned to at least longitudinally span a portion of a horizontally oriented bridge of a high voltage transmission tower superjacent to a high voltage insulator suspended from the bridge; the generally tubular frame including; at least one indentation disposed along a longitudinal axis of the generally tubular frame and dimensioned to peripherally surround a portion of a generally vertically oriented structural member of the high voltage transmission tower; a mesh disposed over a substantial portion of the generally tubular frame; means for attaching the mesh to the generally tubular frame; and means for attaching the avian guard to the bridge.

In a related embodiment of the invention, the tie down means is at least one of tie wraps, twine, straps, clips and magnets. In another related embodiment of the invention, the means for attaching the avian guard to the bridge comprises a plurality of flaps coupled to at least the mesh.

In a related embodiment of the invention, the mesh comprises a shade screen having a shade protection in a range of 40–85%. In another related embodiment of the invention, the mesh further comprises an ultraviolet ray stabilized polyethylene construction.

In a third embodiment of the invention, the avian guard apparatus comprises: a generally rectangular frame of tubular construction dimensioned to longitudinally and laterally span a portion of a horizontally oriented bridge of a high voltage transmission tower superjacent to a high voltage insulator suspended from the bridge; the generally rectangular frame including; a mesh disposed over a substantial portion of the generally rectangular frame; the mesh including, a pair of pockets longitudinally disposed at both ends of the mesh, the pair of pockets dimensioned so as to laterally encompass each end of the generally rectangular frame; and means for attaching the avian guard to the bridge.

In a related embodiment of the invention, the means for attaching the avian guard to the bridge is at least one of tie wraps, twine, straps, clips and magnets. In another related embodiment of the invention, the means for attaching the avian guard is disposed longitudinally on at least a side of the generally rectangular frame. In a final related embodiment of the invention, the means for attaching the avian guard is interspaced longitudinally on at least a side of the generally rectangular frame.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. Optional components are generally shown in dashed lines. It is intended that changes and modifications can be made to the described embodiment without departing from the true scope and spirit of the subject invention as defined in the claims.

DETAILED DESCRIPTION

This present invention provides a high voltage transmission tower guard apparatus which minimizes the accumulation of corrosive and conductive debris on high voltage insulators due to the roosting and/or nesting of birds in and on a high voltage transmission tower. The invention is described in the various aspects and embodiments provided below.

Figure 1:
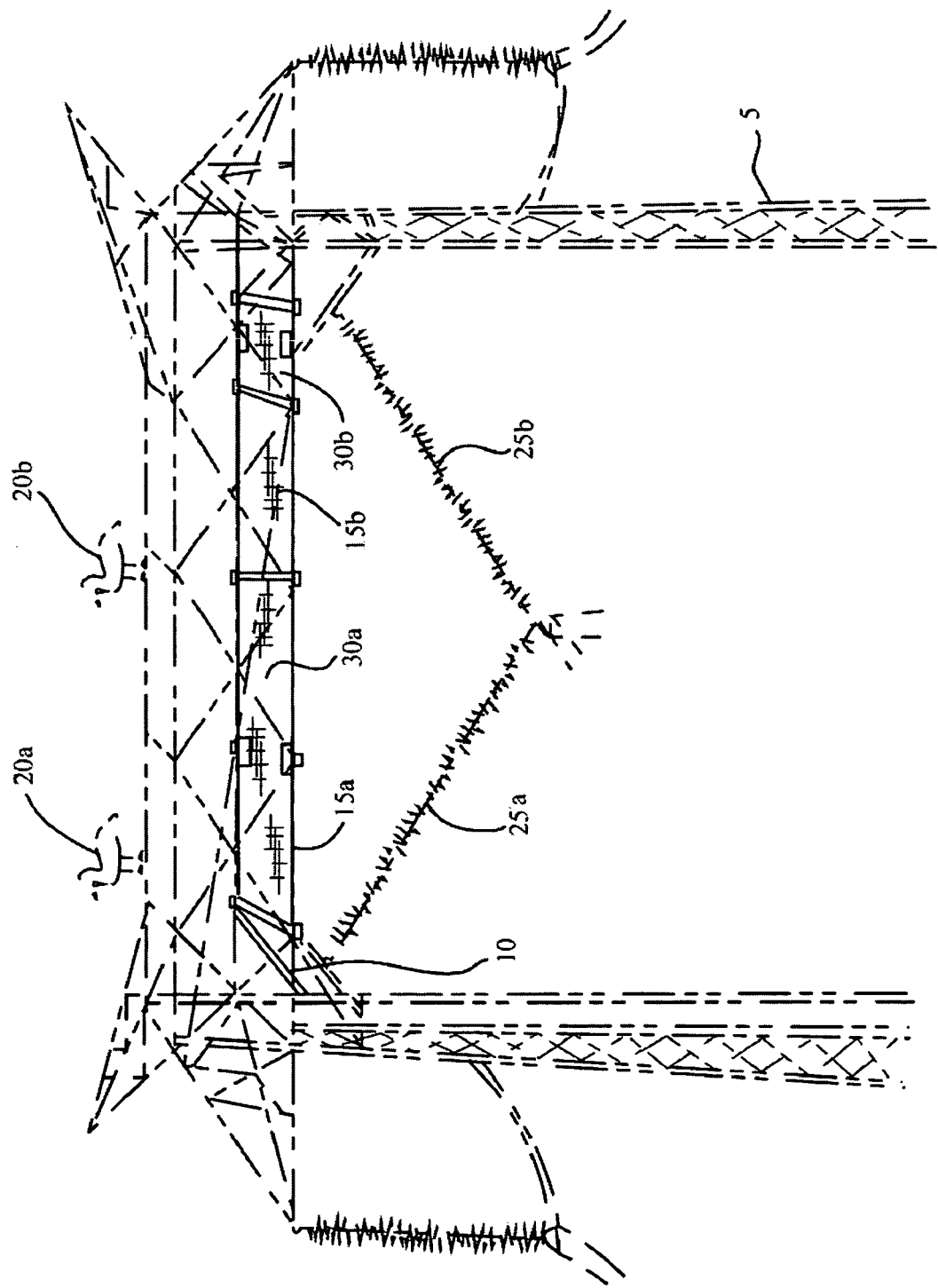
FIG. 1—depicts an example installation of the invention in a typical 500 kilovolt high voltage transmission tower.

Referring to FIG. 1, an exemplary embodiment of the invention is depicted in which a pair of avian guards 15a, 15b are installed upon a cross bridge 10 of a high voltage transmission tower 5 superjacent to one or more high voltage insulators 25a, 25b. Two of the avian guards 15a, 15b are preferred for 500 kilovolt transmission towers to simplify transport, assembly, installation and maintenance of the avian guards 15a, 15b.

One skilled in the art will appreciate that the avian guard apparatus 15 may be dimensioned to fit nearly any high voltage transmission tower arrangement.

Waste excrements and other debris released from birds 20a, 20b roosting and/or nesting on or in the high voltage transmission tower 5 is prevented from reaching the high voltage insulators 25a, 25b by a dielectric mesh 30 incorporated into the invention.

Figure 2:
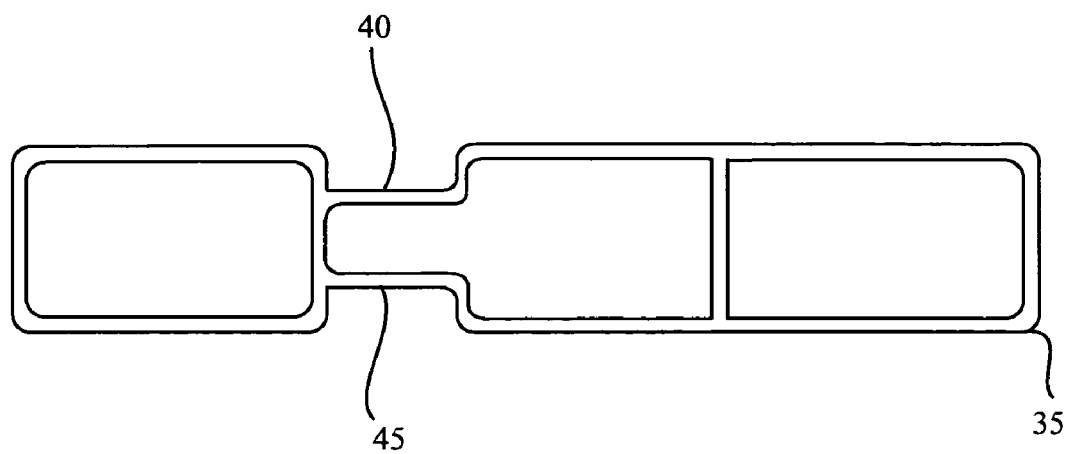
FIG. 2—depicts a top view of a tubular frame incorporated into the invention.

Referring to FIG. 2, an exemplary embodiment of a frame 35 is depicted. The frame 35 is preferably constructed of dielectric polymeric materials to prevent shocking of the workers during installation. In an embodiment of the invention, the dielectric polymeric material is constructed from tubular polyvinyl chloride (PVC), similar light weight polymeric materials or tubular fiberglass. The frame 35 is designed to be lightweight for easy installation, maintenance and removal from the high voltage transmission tower 5. In one embodiment of the invention, the frame's components are assembled from standard 0.75" to 1.25" schedule 40 PVC piping and PVC pipe fittings throughout the invention to minimize construction costs. In another embodiment of the invention, components of the frame are constructed using an injection molding process. In both embodiments of the invention, the frames' components are assembled using a PVC solvent or epoxy based cement.

Figure 3:
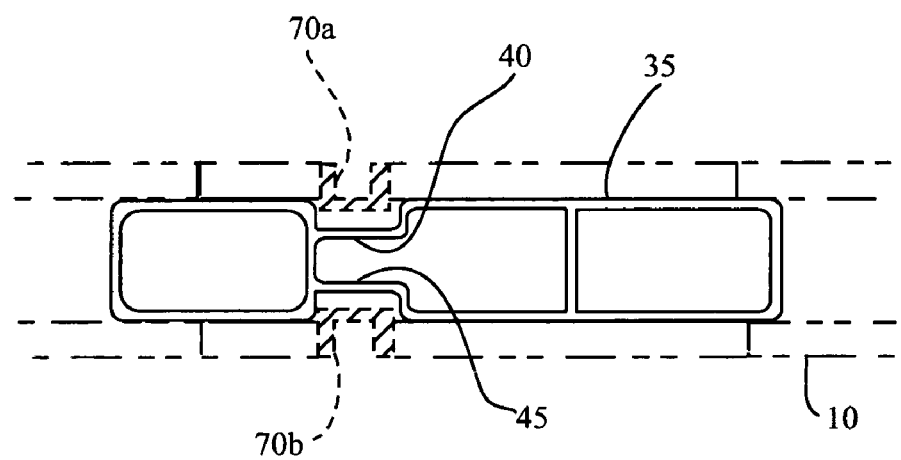
FIG. 3—depicts a cross sectional top view of the invention installed in the high voltage tower.

The frame 35 is generally rectangular in shape and dimensioned so as to span the width and a portion of the length of the cross bridge 10. The generally rectangular shape is interrupted by a pair of indentations 40, 45 which are disposed contralaterally from each other and paracentrally from one end of the frame 35. The indentations 40, 45 are provided to partially surround vertically oriented structural members 70a, 70b provided inside the high voltage tower 5 and cross bridge 10 as is shown in FIG. 3.

Figure 4:
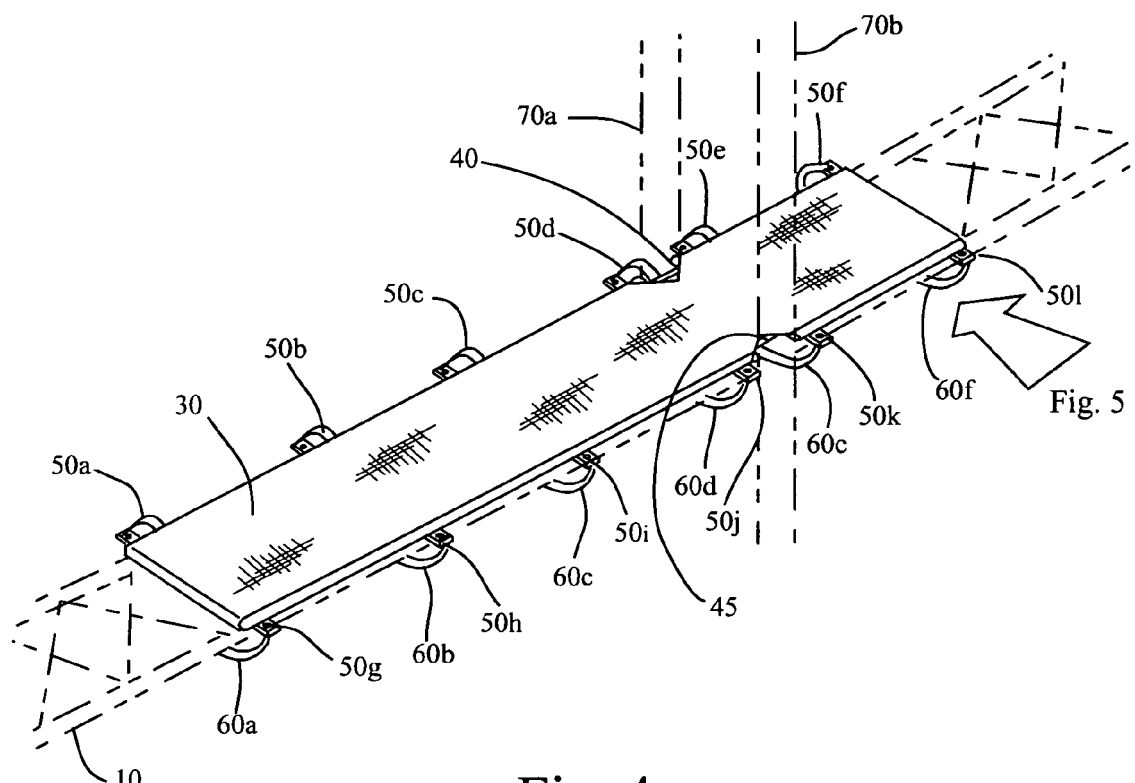
FIG. 4—depicts a perspective view of the invention

Referring to FIG. 4, a perspective view of an embodiment of the invention is depicted. The mesh 30 used in a preferred embodiment of the invention is constructed from commercially available ultraviolet ray stabilized polyethylene shade cloth having a shade factor in the range of 70–85%. However, other shade factors within the range of 40–85% may used in locations subject to high winds or otherwise impacted by other local environmental factors. A suitable commercial supplier for the various grades of shade cloths is Gempler's, Inc., P.O. Box 44993, Madison, Wis. 53744-4993 or see http:\www.gemplers.com.

The mesh 30 has attached thereto a plurality of flaps 50 a–l interspersed on both longitudinal sides of the frame 35. Each flap includes an aperture for attaching the plurality of flaps 50 a–l to the cross bridge 10. The avian guard 15 may be attached to the cross bridge 10 using any convenient and preferably dielectric tie down materials 60a–f for example; tie wraps, polypropylene twine, magnetic strips, Velcro strips, straps, plastic clips, poly-zip ties, and the like. In another embodiment of the invention, the flaps are eliminated by directly forcing the tie-down means 60a–l through the mesh 30 and directly attaching the avian guard 15 to the cross bridge 10. For temporary installations, even duct tape will suffice.

Figure 5:
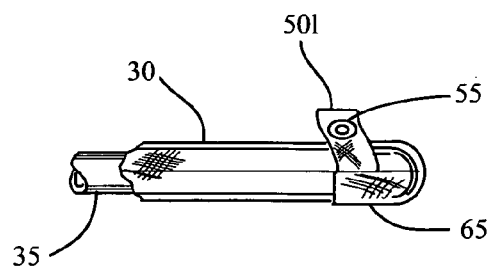
FIG. 5—depicts a partial side view of the invention with emphasis on an attachment pocket and flap.

One skilled in the art will appreciate that any reasonable mechanism may be employed to attach the avian guard to the cross bridge Referring to FIG. 5, a side view of a pocket 65 provided at each longitudinal end of the mesh 30 is depicted. The pocket 65 is dimensioned to encompass the width of the frame 35 at each longitudinal end to sufficiently retain the mesh 30 over the frame 35. The pocket 65 allows for easy installation and maintenance of the avian guard 15. Each pocket 65 is constructed from the mesh 30 material which is folded back sufficiently along a longitudinal axis. The folded back material may be retained in the pocket 65 arrangement by sewing with nylon thread, adhesives and/or thermal melting.

The avian guard 15 may be assembled at the worksite by placing each pocket 65 over each longitudinal end of the frame 35. The avian guard is then placed on top of the cross bridge 10 and attached thereto using the tie means 60a–f and a grommet lined aperture 55 discussed above.

Some vertical tilting of the assembled avian guard 15 may necessary to allow the indentations 40, 45 to pass around the vertical structural members 70a, 70b of the high voltage tower 5.

The foregoing described embodiments of the invention are provided as illustrations and descriptions. They are not intended to limit the invention to precise form described. In particular, it is contemplated that functional implementation of the invention described herein may be constructed in various shapes and of different materials. No specific limitation is intended to a particular shape or construction material. Other variations and embodiments are possible in light of above teachings, and it is not intended that this Detailed Description limit the scope of invention, but rather by the Claims following herein.

What is claimed:

1. An avian guard for protection of high voltage transmission equipment comprising:
    a generally tubular frame dimensioned to at least longitudinally span a portion of a horizontally oriented bridge of a high voltage transmission tower superjacent to a high voltage insulator suspended from said bridge;
    a mesh disposed over a substantial portion of said generally tubular frame;
    means for attaching said mesh to said generally tubular frame; and,
    means for attaching said avian guard to said bridge;
    wherein said generally tubular frame includes a pair of indentations disposed contralaterally to each other along parallel portions of said generally tubular frame; each of said pair of indentations being dimensioned to peripherally surround portions of generally vertically oriented structural members of said high voltage transmission tower.

2. The avian guard according to claim 1 wherein said means for attaching said mesh to said generally tubular frame comprises at least one pocket longitudinally disposed at an end of said mesh.

3. The avian guard according to claim 2 wherein said at least one pocket is dimensioned so as to laterally encompass an end of said generally tubular frame.

4. The avian guard according to claim 1 wherein said means for attaching said avian guard to said bridge comprises a plurality of flaps coupled to either said mesh or said tubular frame.

5. The avian guard according to claim 4 wherein each of said plurality of flaps further comprises an aperture dimensioned to receive a tie down means.

6. The avian guard according to claim 4 wherein at least a portion of said plurality of flaps are interspaced longitudinally on at least a side of said generally tubular frame.

7. The avian guard according to claim 1 wherein said pair of indentations are disposed generally less than paracentral from one end of said generally tubular frame.

8. The avian guard according to claim 1 wherein said mesh includes an ultraviolet ray resistant polymer construction.

9. The avian guard according to claim 1 wherein said mesh is constructed from an exterior grade shade cloth.

10. The avian guard according to claim 1 wherein said means for attaching said avian guard to said bridge comprises tie down means.

11. The avian guard according to claim 10 wherein said tie down means is at least one of tie wraps, twine, straps, clips and magnets.

12. An avian guard for protection of high voltage transmission equipment comprising:
    a generally tubular frame dimensioned to at least longitudinally span a portion of a horizontally oriented bridge of a high voltage transmission tower superjacent to a high voltage insulator suspended from said bridge; wherein said disposed mesh forms a guard area sufficient to prevent debris from falling onto said high voltage insulator; said generally tubular frame including;
    a pair of indentations disposed contralaterally to each other along parallel portions of said generally tubular frame; each of said pair of indentations being dimensioned to peripherally surround portions of generally vertically oriented structural members of said high voltage transmission tower;
    a mesh disposed over a substantial portion of said generally tubular frame;
    means for attaching said mesh to said generally tubular frame; and,
    means for attaching said avian guard to said bridge.

13. The avian guard according to claim 12 wherein said means for attaching said avian guard to said bridge comprises a plurality of means attachable to either said mesh or said tubular frame.

14. The avian guard according to claim 12 wherein said mesh comprises a shade screen having a shade protection in a range of 40–85%.

15. The avian guard according to claim 14 wherein said mesh further comprises an ultraviolet ray stabilized polyethylene construction.

16. An avian guard for protection of high voltage transmission equipment comprising:
    a generally rectangular frame of tubular construction dimensioned to longitudinally and laterally span a portion of a horizontally oriented bridge of a high voltage transmission tower superjacent to a high voltage insulator suspended from said bridge; said generally rectangular frame including;
    a mesh disposed over a substantial portion of said generally rectangular frame including;
    a pair of pockets longitudinally disposed at both ends of said mesh, said pair of pockets dimensioned so as to laterally encompass each end of said generally rectangular frame; and,
    means for attaching said avian guard to said bridge;
    wherein said generally rectangular tubular frame includes a pair of indentations disposed contralaterally to each other along parallel portions of said generally rectangular tubular frame;
    each of said pair of indentations being dimensioned to peripherally surround portions of generally vertically oriented structural members of said high voltage transmission tower.

17. The avian guard according to claim 16 wherein said means for attaching said avian guard to said bridge is at least one of tie wraps, twine, straps, clips and magnets.

18. The avian guard according to claim 16 wherein said means for attaching said avian guard is interspaced longitudinally on at least a side of said generally rectangular frame.

* * * * *